(12) United States Patent
Pani

(10) Patent No.: US 9,654,300 B2
(45) Date of Patent: May 16, 2017

(54) N-WAY VIRTUAL PORT CHANNELS USING DYNAMIC ADDRESSING AND MODIFIED ROUTING

(71) Applicant: Cisco Technology, Inc., San Jose, CA (US)

(72) Inventor: Ayaskant Pani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 14/336,964

(22) Filed: Jul. 21, 2014

(65) Prior Publication Data

US 2015/0124586 A1     May 7, 2015

Related U.S. Application Data

(60) Provisional application No. 61/900,359, filed on Nov. 5, 2013.

(51) Int. Cl.
*H04L 12/18* (2006.01)
*H04L 12/761* (2013.01)
(Continued)

(52) U.S. Cl.
CPC .......... *H04L 12/18* (2013.01); *H04L 12/4633* (2013.01); *H04L 41/082* (2013.01); *H04L 41/12* (2013.01); *H04L 41/22* (2013.01); *H04L 43/0811* (2013.01); *H04L 43/50* (2013.01); *H04L 45/02* (2013.01); *H04L 45/12* (2013.01); *H04L 45/16* (2013.01); *H04L 45/18* (2013.01); *H04L 45/20* (2013.01); *H04L 45/28* (2013.01); *H04L 45/48* (2013.01); *H04L 45/64* (2013.01); *H04L 49/201* (2013.01); *H04L 49/25* (2013.01); *H04L 61/2007* (2013.01); *H04L 61/2061* (2013.01); *H04L 61/6004* (2013.01); *H04L 69/22* (2013.01); *H04L 61/103* (2013.01)

(58) Field of Classification Search
CPC . H04L 12/18; H04L 12/4633; H04L 61/2007; H04L 61/6004; H04L 41/22; H04L 45/64; H04L 49/201; H04L 43/50; H04L 41/12; H04L 61/2061; H04L 49/25
See application file for complete search history.

(56) References Cited

U.S. PATENT DOCUMENTS 6,456,624 B1    9/2002 Eccles et al.
7,152,117 B1    12/2006 Stapp et al.
(Continued)

FOREIGN PATENT DOCUMENTS

WO    WO 2014071996    5/2014

*Primary Examiner* — Jackie Zuniga Abad
(74) *Attorney, Agent, or Firm* — Polsinelli PC

(57) ABSTRACT

Systems, methods, and non-transitory computer-readable storage media for dynamic addressing of virtual port channels is described. In some implementations, a virtual IP address can be dynamically generated based on which links in a virtual port channel are active. If the numbers of active links in the virtual port channel changes, the virtual IP address can be dynamically changed. The virtual IP address can be dynamically adjusted by changing the values of individual bits in the virtual IP address that correspond to links in the virtual port channel. The virtual IP address can be used as a tunnel end point address in a VXLAN environment.

12 Claims, 7 Drawing Sheets

(51) Int. Cl.

| | |
|---|---|
| H04L 12/753 | (2013.01) |
| H04L 12/721 | (2013.01) |
| H04L 12/703 | (2013.01) |
| H04L 12/705 | (2013.01) |
| H04L 12/26 | (2006.01) |
| H04L 12/733 | (2013.01) |
| H04L 12/24 | (2006.01) |
| H04L 12/751 | (2013.01) |
| H04L 12/947 | (2013.01) |
| H04L 12/931 | (2013.01) |
| H04L 12/715 | (2013.01) |
| H04L 29/12 | (2006.01) |
| H04L 29/06 | (2006.01) |
| H04L 12/46 | (2006.01) |

(56) References Cited

U.S. PATENT DOCUMENTS

| | | |
|---|---|---|
| 7,177,946 B1 | 2/2007 | Kaluve et al. |
| 7,826,400 B2 | 11/2010 | Sakauchi |
| 7,848,340 B2 | 12/2010 | Sakauchi et al. |
| 8,339,973 B1 | 12/2012 | Pichumani et al. |
| 8,868,766 B1 | 10/2014 | Theimer et al. |
| 9,258,195 B1 | 2/2016 | Pendleton et al. |
| 9,374,294 B1 | 6/2016 | Pani |
| 9,444,634 B2 | 9/2016 | Pani et al. |
| 2003/0067912 A1 | 4/2003 | Mead et al. |
| 2003/0115319 A1 | 6/2003 | Dawson et al. |
| 2004/0103310 A1 | 5/2004 | Sobel et al. |
| 2004/0160956 A1 | 8/2004 | Hardy et al. |
| 2004/0249960 A1 | 12/2004 | Hardy et al. |
| 2005/0010685 A1 | 1/2005 | Ramnath et al. |
| 2005/0013280 A1 | 1/2005 | Buddhikot et al. |
| 2005/0083835 A1 | 4/2005 | Prairie et al. |
| 2005/0117593 A1 | 6/2005 | Shand |
| 2005/0175020 A1 | 8/2005 | Park et al. |
| 2005/0207410 A1 | 9/2005 | Adhikari |
| 2006/0013143 A1 | 1/2006 | Yasuie et al. |
| 2006/0039364 A1 | 2/2006 | Wright |
| 2006/0072461 A1 | 4/2006 | Luong et al. |
| 2006/0193332 A1 | 8/2006 | Qian et al. |
| 2006/0209688 A1 | 9/2006 | Tsuge et al. |
| 2006/0221950 A1 | 10/2006 | Heer |
| 2006/0227790 A1 | 10/2006 | Yeung et al. |
| 2006/0268742 A1 | 11/2006 | Chu et al. |
| 2006/0274647 A1 | 12/2006 | Wang et al. |
| 2006/0280179 A1 | 12/2006 | Meier |
| 2007/0025241 A1 | 2/2007 | Nadeau et al. |
| 2007/0047463 A1 | 3/2007 | Jarvis et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0217415 A1 | 9/2007 | Wijnands et al. |
| 2008/0031130 A1 | 2/2008 | Raj et al. |
| 2008/0092213 A1 | 4/2008 | Wei |
| 2008/0212496 A1 | 9/2008 | Zou |
| 2009/0067322 A1 | 3/2009 | Shand et al. |
| 2009/0094357 A1 | 4/2009 | Keohane et al. |
| 2009/0161567 A1 | 6/2009 | Jayawardena et al. |
| 2009/0193103 A1 | 7/2009 | Small et al. |
| 2009/0232011 A1 | 9/2009 | Li et al. |
| 2009/0238196 A1 | 9/2009 | Ukita et al. |
| 2010/0020719 A1 | 1/2010 | Chu et al. |
| 2010/0020726 A1 | 1/2010 | Chu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0312875 A1 | 12/2010 | Wilerson et al. |
| 2011/0022725 A1 | 1/2011 | Farkas |
| 2011/0110241 A1 | 5/2011 | Atkinson et al. |
| 2011/0138310 A1 | 6/2011 | Gomez et al. |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0243136 A1* | 10/2011 | Raman .................. H04L 45/60 370/392 |
| 2011/0280572 A1* | 11/2011 | Vobbilisetty ............ H04L 49/70 398/45 |
| 2011/0286447 A1 | 11/2011 | Liu et al. |
| 2011/0299406 A1 | 12/2011 | Vobbilisetty et al. |
| 2011/0321031 A1 | 12/2011 | Dournov et al. |
| 2012/0030150 A1 | 2/2012 | McAuley et al. |
| 2012/0057505 A1 | 3/2012 | Xue |
| 2012/0102114 A1 | 4/2012 | Dunn et al. |
| 2012/0300669 A1 | 11/2012 | Zahavi |
| 2013/0055155 A1 | 2/2013 | Wong et al. |
| 2013/0097335 A1 | 4/2013 | Jiang et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0086097 A1 | 3/2014 | Qu et al. |
| 2014/0146817 A1 | 5/2014 | Zhang |
| 2014/0149819 A1 | 5/2014 | Lu et al. |
| 2014/0201375 A1 | 7/2014 | Beereddy et al. |
| 2014/0219275 A1 | 8/2014 | Allan et al. |
| 2014/0269712 A1 | 9/2014 | Kidambi |
| 2015/0016277 A1 | 1/2015 | Smith et al. |
| 2015/0092593 A1 | 4/2015 | Kompella |
| 2015/0113143 A1 | 4/2015 | Stuart et al. |
| 2015/0124587 A1 | 5/2015 | Pani |
| 2015/0124629 A1 | 5/2015 | Pani |
| 2015/0124642 A1 | 5/2015 | Pani |
| 2015/0124644 A1 | 5/2015 | Pani |
| 2015/0124654 A1 | 5/2015 | Pani |
| 2015/0124823 A1 | 5/2015 | Pani et al. |
| 2015/0127701 A1 | 5/2015 | Chu et al. |
| 2015/0188771 A1 | 7/2015 | Allan et al. |
| 2015/0378712 A1 | 12/2015 | Cameron et al. |
| 2015/0378969 A1 | 12/2015 | Powell et al. |
| 2016/0119204 A1 | 4/2016 | Murasato et al. |

* cited by examiner

US 9,654,300 B2

N-WAY VIRTUAL PORT CHANNELS USING DYNAMIC ADDRESSING AND MODIFIED ROUTING

RELATED APPLICATIONS

This application claims priority to U.S. Provisional Patent Application No. 61/900,359, filed on Nov. 5, 2013, the content of which is incorporated herein by reference in its entirety.

TECHNICAL FIELD

The present technology pertains to overlay networks, and more specifically pertains to virtual port channeling.

BACKGROUND

Virtual port channeling is a mechanism that allows for logical bundling of multiple links from two different network switches connected to the same end host or peer system. This kind of bundling provides all of the benefits of traditional port channels (e.g., that provide multiple links to a single switch), such as resiliency against link failure and higher bandwidth, while providing resiliency against switch failure because there is a second switch in a virtual port channel that can provide an active connection for the end host in the event that the first switch fails. Traditional virtual port channeling (VPC) is implemented between a pair of switches that form the VPC bundle. From the end host point of view, the VPC is similar to a logical port with higher bandwidth. For a VXLAN deployment, both switches in the VPC advertise neighboring end host nodes attachment with the same virtual IP (VIP) address for the links in the VPC. Thus for any remote tunnel end point attached tenant host willing to talk to an end host connected to the VPC link the inner (tenant) packet will be encapsulated with the VIP address as the VXLAN outer destination address. This VXLAN packet can be forwarded (e.g., in the VXLAN infra network) to either of the VPC switches and can be de-encapsulated by either of the two VPC switches and the inner-packet is then forwarded to the intended tenant host (attached to the VPC link). If one of the VPC switches fails, the other switch will advertise its physical TEP (tunnel end point) IP address instead of the VPC address as the address for connecting to the neighboring end hosts. While traditional VPC provides a mechanism to increase bandwidth and provide switch/link failure protection, traditional VPC is limited to only two switches in the virtual port channel because there currently is no mechanism to address and provide failure protection for links associated with more than two switches in a VPC.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
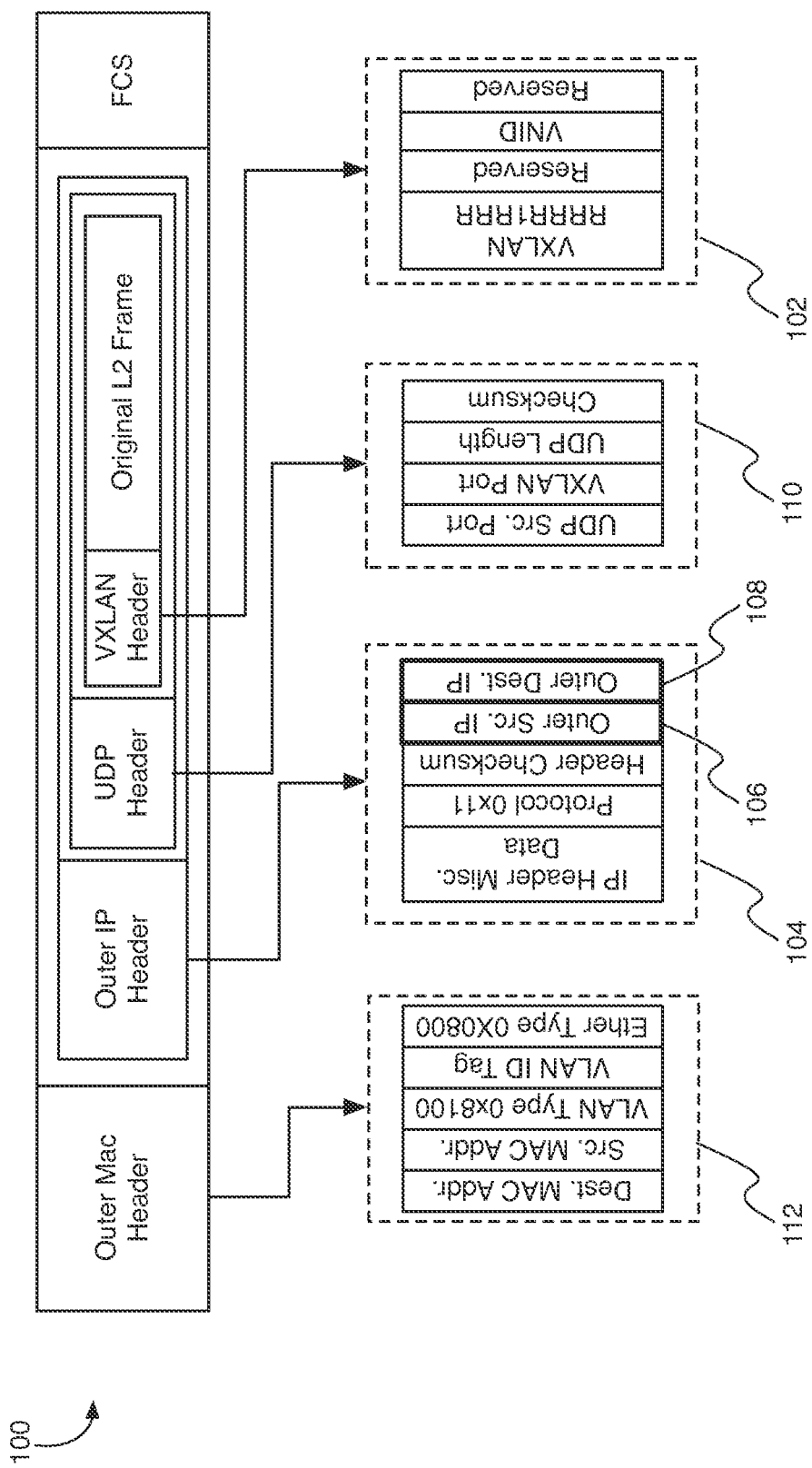
FIG. 1 illustrates an example VXLAN packet.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some implementations, an n-way virtual port channel can be configured by dynamically generating a virtual internet protocol (VIP) addresses for the active links (e.g., ports) in a VPC peer group (e.g., the switches and links that make up the VPC). For example, a VPC peer group can include a number (e.g., two or more) of links to a number (e.g., two or more) of switches that connect to a particular end host or group of end hosts. A packet destined for the particular end host can be transmitted to any of the switches in the VPC-peer-group for delivery to the particular end host, for example.

In some implementations, the VIP address for the VPC peer group can be dynamically generated based on which links in the VPC peer group are active. For example, the VIP address (e.g., VPC IP address, virtual IP address) for the VPC peer group can be a 32-bit identifier. The most significant 24 bits of the VPC address can be assigned a VPC peer group identifier (e.g., a value that identifies the peer group in general). The least significant 8 bits of the VPC address can be dynamically generated based on which links (e.g., connections to switches in the group) are active. Different combinations of bits (e.g., other than 24 and 8) can be used to specify the VPC peer group identifier and dynamically adjust the IP address. For example, the most significant 20 bits can be used for the VPC peer group identifier and the least significant 12 bits can be used to dynamically adjust the VIP address for up to 12 switches. If the VPC peer group includes 8 links to 8 switches, each of the least significant 8 bits of the VPC address can be assigned to a switch and can be turned on (e.g., value 1) or off (e.g., value 0) based the availability of the assigned switch's link to the end host device. Thus, if the last 8 bits of the VPC address are 00011011, there are only 4 links available and when read from right to left, the first link (e.g., switch) in the VPC peer group is available, the second link is available, the third link is not available, and so on. The VPC address based on these last 8 bits would be VPC_Peer_Group_ID.0027 (e.g., 114.39.45.27). This VPC address can be used to advertise connections to hosts that can be reached using links to this VPC peer group.

In some implementations, the VPC address can change when a new link (e.g., switch) is added or removed from the VPC peer group. For example, if the third link in the scenario above becomes available (e.g., a new link is added to the VPC peer group, an unavailable link is fixed and is now available), the last 8 bits of the VPC address can be 00011111 and a new VPC address VPC_Peer_Group_ID.0031 (e.g., 22.22.22.31) can be generated for this VPC peer group. Similarly, if the second link in the scenario above becomes unavailable (e.g., the link fails, the switch fails, etc.), then the last 8 bits of the VPC address can be changed to 00011101 and a new VPC address VPC_Peer_Group_ID.0029 (e.g., 22.22.22.29) can be generated for the VPC peer group. This updated VPC address will be used to advertise connections to all hosts that can be reached using links to this VPC peer group. For example, this dynamically generated VPC address can be used as a tunnel end point (TEP) address when transmitting packets between hosts through an overlay network, such as a virtual extensible local area network (VXLAN), as described further below.

DESCRIPTION

A computer network is a geographically distributed collection of nodes interconnected by communication links and segments for transporting data between endpoints, such as personal computers and workstations. Many types of networks are available, with the types ranging from local area networks (LANs) to wide area networks (WANs) and virtual extensible local area networks (VXLANs). LANs typically connect the nodes over dedicated private communications links located in the same general physical location, such as a building or campus. WANs, on the other hand, typically connect geographically dispersed nodes over long-distance communications links, such as common carrier telephone lines, optical light-paths, synchronous optical networks (SONET), or synchronous digital hierarchy (SDH) links. Moreover, VXLANs generally allow virtual networks to be created and layered over a physical network infrastructure.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Cloud computing can generally include Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), compute/processing devices (servers, CPU's, memory, brute force processing capability), storage devices (e.g., network attached storages, storage area network devices), etc., and may be used to support virtual networks, virtual machines (VM), databases, applications (Apps), etc.

Cloud computing resources may include a "private cloud," a "public cloud," and/or a "hybrid cloud." A "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way. Cloud computing resources can also be provisioned via virtual networks in an overlay network, such as a VXLAN.

Network virtualization allows multiple numbers of VMs to be attached to the network via respective virtual LANs (VLANs). The VMs can be grouped according to their respective VLAN.

Overlay network protocols, such as VXLAN, provide a traffic encapsulation scheme that allows network traffic to be carried across Layer 2 (L2) and Layer 3 (L3) networks over a logical tunnel. Such logical tunnels can be originated and terminated through virtual tunnel end points (VTEPs). Moreover, overlay networks, such as VXLANs, can include logical network segments, such as VXLAN segments, which can include L2 and/or L3 overlay networks over which VMs communicate. The logical network segments can be identified through a network identifier, such as a VXLAN network identifier (VNI), which can specifically identify an associated VXLAN or logical network segment.

FIG. 1 illustrates an example VXLAN packet 100. VXLAN is a Layer 2 overlay scheme over a Layer 3 network. It uses MAC Address-in-User Datagram Protocol (MAC-in-UDP) encapsulation to provide a means to extend Layer 2 segments across the data center network. VXLAN allows for a flexible, large-scale multi-tenant environment over a shared common physical infrastructure. The transport protocol over the physical data center network is IP plus UDP.

VXLAN defines a MAC-in-UDP encapsulation scheme where the original Layer 2 frame has a VXLAN header added and is then placed in a UDP-IP packet. With this MAC-in-UDP encapsulation, VXLAN tunnels Layer 2 network over Layer 3 network. As shown in FIG. 1, VXLAN includes an 8-byte header 102 that includes a 24-bit virtual network identifier (VNID) and a few reserved bits. The VXLAN header together with the original Ethernet frame goes into the UDP payload. The 24-bit VNID is used to identify Layer 2 segments and to maintain Layer 2 isolation between the segments. With all 24 bits in VNID, VXLAN can support 16 million LAN segments.

Figure 2:
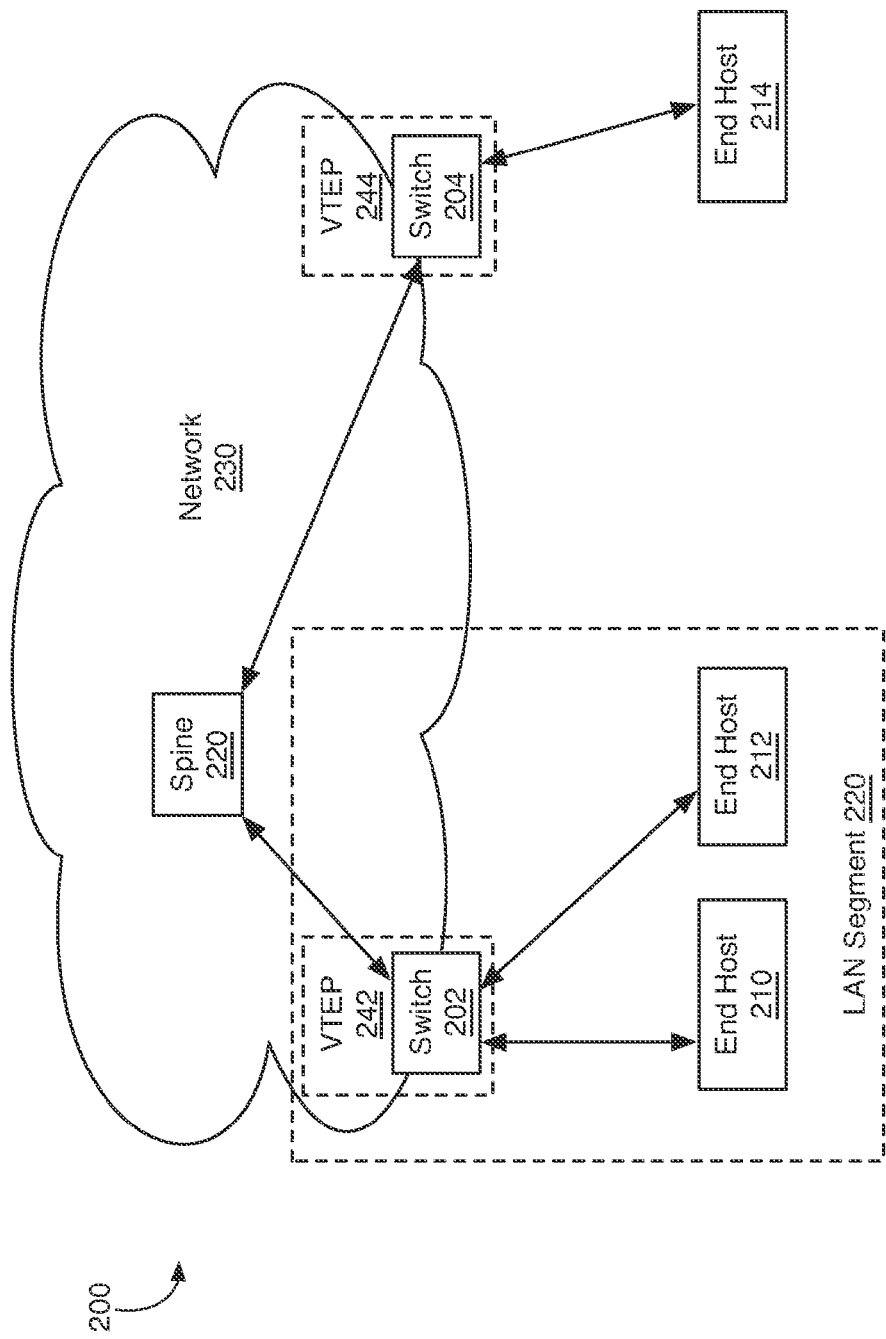
FIG. 2 is a block diagram of an example network including a VXLAN having VXLAN tunnel end points (VTEP).

FIG. 2 is a block diagram of an example network 200 including VXLAN 230 having VXLAN tunnel end points (VTEPs). VXLAN uses VTEP devices 202 and 204 (e.g., top of rack switches) to map tenant's end devices (e.g., hosts 210, 212, 214) to VXLAN segments and perform VXLAN encapsulation and de-encapsulation. Each VTEP device 202 and 204 has two interfaces: one is a switch interface on the local LAN segment (e.g., LAN segment 220) to support local end point communication through bridging, and the other is an IP interface to the transport IP network 230 (e.g., VXLAN network 230). Moreover, each VTEP device 202 and 204 includes a VTEP function that provides two logical interfaces, including an uplink and a downlink logical interface for receiving VXLAN frames and acting as a tunnel end point routing the VXLAN frames with an IP address.

The IP interface has a unique IP address that identifies VTEP device 202 on the transport IP network known as the infrastructure LAN. The VTEP device 202 uses this IP address to encapsulate Ethernet frames and transmits the encapsulated packets to the transport network through the IP interface. A VTEP device also discovers the remote VTEPs for its VXLAN segments and learns remote (tenant) MAC Address-to-VTEP mappings through its IP interface. The function components of VTEPs and the logical topology that is created for Layer 2 connectivity across the transport IP network is illustrated by FIG. 2.

In some implementations, the VXLAN segments (e.g., segment 220) are independent of the underlying network topology. Conversely, the underlying IP network between VTEPs is independent of the VXLAN overlay. Referring back to FIG. 1, the IP network 230 routes the encapsulated packets based on the outer IP address header 104, which has the initiating VTEP 242 as the source IP address 106 and the terminating VTEP 244 as the destination IP address 108.

VXLAN uses stateless tunnels between VTEPs 202 and 204 to transmit traffic of the overlay Layer 2 network through the Layer 3 transport network. Referring to FIG. 2, end host 210 and end host 214 can communicate with each other through a VXLAN tunnel between VTEP 242 (switch 202) and VTEP 214 (switch 214). For example, network 230 can be implemented using a link-state routing protocol (e.g., intermediate system to intermediate system, open shortest path first, etc.). Switch 202 (VTEP) and switch 204 (VTEP) can advertise neighboring devices using a link state advertisement that identifies the address of the switch (e.g., switch 202, switch 204). The addresses of the devices linked to the switch (e.g., end host 210 and 212 for switch 202 and end host 214 for switch 204) are either learned in data plane or distributed to other switches using some control plane mechanism (e.g., typically a different control plane protocol from the infra routing protocol). These link state advertisements can be shared with other devices on network 230, such as spine 220. Each network device can aggregate the information received in the link state advertisements to generate a map of network 230 (e.g., the VXLAN). If the addresses associated with remote devices are not known to the network devices (e.g., switch 202, spine 220, switch 204, etc.), the network devices in network 230 can be configured to perform remote VTEP discovery and tenant address learning, as described below.

When end host 210 sends packets to end host 214, end host 210 generates Ethernet frames with the address of end host 214 as the destination and the address of end host 210 as the source. End host 210 can send the frames to VTEP 242. VTEP 242, having a mapping of the MAC address of end host 214 to the IP address of VTEP 244 (e.g., switch 202) in its mapping table, performs VXLAN encapsulation on the packets by adding VXLAN header 102, UDP header 110, and outer IP address header 104 to the packets, as illustrated above in FIG. 1. In the outer IP address header 104, the source IP address 106 is the IP address of VTEP 242 and the destination IP address 108 is the IP address of VTEP 244. VTEP 242 then performs an IP lookup for the IP address of VTEP 244 to resolve the next hop in the transmit network and subsequently uses the MAC address of the next hop device (e.g., spine 220) to further encapsulate the packets in an Ethernet frame to send to the next hop device.

The packets are routed toward VTEP 244 through the transport network based on their outer IP address header 104, which has the IP address of VTEP 244 as the destination address. After VTEP 244 receives the packets, VTEP 244 strips off the outer Ethernet, IP, UDP and VXLAN headers and forwards the packets to end host 214 based on the original destination address in the Ethernet frame.

In some implementations, network 230 (e.g., VXLAN) can use classic Layer 2 data plane flooding and learning mechanisms for remote VTEP discovery and tenant address learning. For example, end host 210 can initiate IP communication with end host 214 without first having information that identifies the MAC address for end host 214. End host 210 can send out an Address Resolution Protocol (ARP) request for the IP address of end host 214 on network 230. VTEP 242 can receive the ARP request. Since VTEP 242 does not have a mapping for the IP address of end host 214, VTEP 242 encapsulates the ARP request in an IP multicast packet and forwards it to spine 220 in a multicast transmission. The encapsulated multicast packet has the IP address of VTEP 242 as the source IP address and the VXLAN multicast group as the destination address, for example. Spine 220 can receive the encapsulated multicast packet and forward the encapsulated multicast packet on to VTEP 244. VTEP 244 can de-encapsulate the packet and check the destination IP address and forward the packet on to end host 214. VTEP 244 can also learn the IP address of VTEP 242 from the outer IP address header and inspect the packet to learn the MAC address of end host 210. VTEP 244 can place this mapping in the mapping table for VTEP 244.

End host 214 can receive the ARP request forwarded by VTEP 244 and can respond with its own MAC address. End host 214 can also lean the IP address to MAC address mapping for end host 210 from the packet. VTEP 244 can receive the ARP reply from end host 214 that has the MAC address for end host 210 as the destination MAC address. Since VTEP 244 now knows about the MAC address to IP address mapping for end host 210 and VTEP 242, VTEP 244 can use a unicast tunnel to forward the ARP reply back to VTEP 242. VTEP 244 can encapsulate the unicast packet, the source IP address is the IP address for VTEP 244 and the destination address is the IP address for VTEP 242. The ARP reply is encapsulated in the UDP payload.

VTEP 242 can receive the encapsulated ARP reply from VTEP 244. VTEP 242 can de-encapsulate the ARP reply and forward the ARP reply to end host 210. VTEP 242 can learn the IP address of VTEP 244 from the outer IP address header and inspect the original packet to learn the MAC address to IP address mapping for end host 214 and VTEP 244. Subsequent IP packets between end host 210 and end host 214 can be unicast forwarded based on the mapping information on VTEP 242 and VTEP 244 using a VXLAN tunnel between them. VTEP 242 can optionally perform proxy ARPs for subsequent requests for the IP address of end host 214 to reduce the flooding over the transport network. During the exchange of packets, spine 220 can also learn the IP address to MAC address mappings for VTEP 242, end host 210, VTEP 244 and end host 214.

Figure 3:
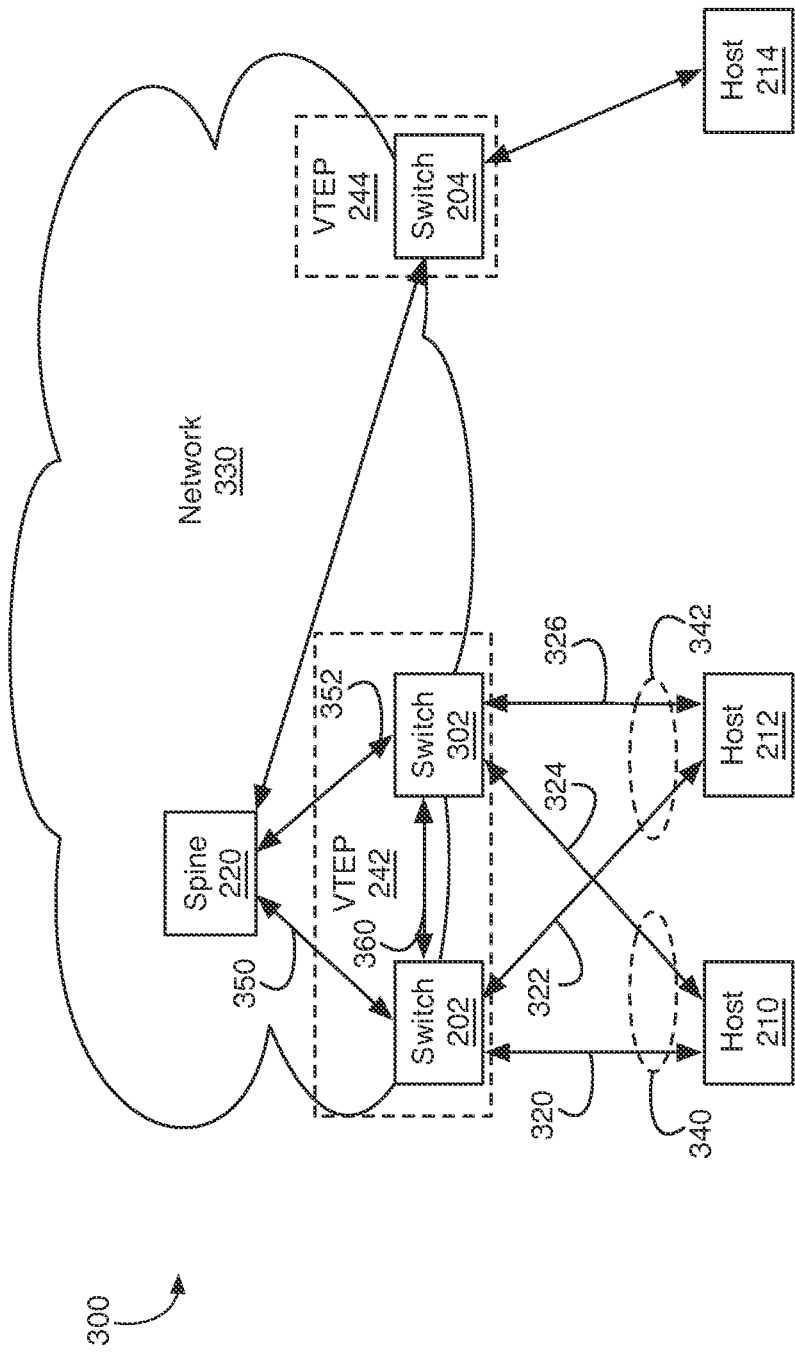
FIG. 3 is a block diagram of an example network including a VXLAN configured with a traditional 2-way virtual port channel.

FIG. 3 is a block diagram of an example network 300 including a VXLAN 330 configured with a traditional 2-way virtual port channel. For example, network 330 can be a VXLAN network similar to network 230, described above. Network 330 can include switches 202 and 302 configured to operate a virtual port channel. For example, switches 202 and 302 can be configured as peers in a VPC peer group. A 2-way virtual port channel 340 can be configured by connecting host 210 to both switches (e.g., switch 202, switch 302) in the VPC peer group. Another 2-way VPC 342 can be configured by connecting host 212 to both switches (e.g., switch 202, switch 302) in the VPC peer group. Each VPC (e.g., VPC 340, VPC 342) can be associated with a virtual IP address. For example, switch 202 can have an IP address 2.2.2.2. Switch 302 can have an IP address 3.3.3.3. For the purpose of VPC these two switches might use 4.4.4.4 as the VIP address.

When operating in a VXLAN, as described above with reference to FIG. 1 and FIG. 2, the VPC pair switches can operate as a virtual TEP (VTEP). The same VTEP 242 IP address can be used as the TEP IP for all the VPC end hosts connected to these two vpc switches. When operating as VPC 340, switch 202 and switch 302 can advertise their link state using the IP address for VPC 340 (e.g., 4.4.4.4). The link state advertisement and all encapsulated VXLAN packets can indicate that host 210 can be reached at the VIP address (e.g., 4.4.4.4) for VPC 340.

Packets destined for host 210 and/or host 212 can be addressed to the VIP address for the VTEP for the VPC switches. When spine 220 receives a packet addressed to the TEP corresponding to VIP, spine 220 can use Equal Cost Multi Path (ECMP) hashing to determine which link (e.g., link 350, link 352) to forward the packet on. The receiving switch (e.g., switch 202 or switch 302) can de-encapsulate and forward the inner packet on to the correct host (e.g., host 210) addressed in the packet.

Sometimes a link in a VPC can fail. For example, link 324 connecting switch 302 to host 210 may fail. If link 324 fails, switch 302 can report the failed link to switch 202 over control plane 360. A link can fail when a port on either end of the link fails. A link can fail when a switch fails or goes offline. For example, switches in a VPC peer group can exchange heartbeat signals that indicate that the sending switch is still operational. If a switch fails to send a heartbeat signal, then the other switch will determine that the sending switch is no longer operational. For example, if switch 302 fails to send a heartbeat signal to switch 202, switch 202 will determine that switch 302 is offline.

When a switch in a traditional 2-way VPC goes offline, the other remaining switch will become the sole switch at VTEP 242. For example, if switch 302 goes offline, switch 202 will report its own IP address (e.g., 2.2.2.2) as the address for VTEP 242. The VPC address (e.g., 4.4.4.4) will not be used until switch 302 comes back online. If switch 302 is ok but link 324 fails, then the VPC IP address (e.g., 4.4.4.4) will be used as the VTEP address for VPC 342 and the IP address for switch 202 (e.g., 2.2.2.2) will be used for the VTEP IP address (by any remote TEP) when attempting to transmit a packet to host 210.

Since 2-way VPC mitigates link failure (and switch failure) by replacing the VIP for the VPC with the IP address of the switch having the surviving link, there is currently no way to add more switches to the VPC. For example, there is no way to remove individual switches from the VPC. There is no way to indicate an alternate grouping of switches for the VPC.

Figure 4:
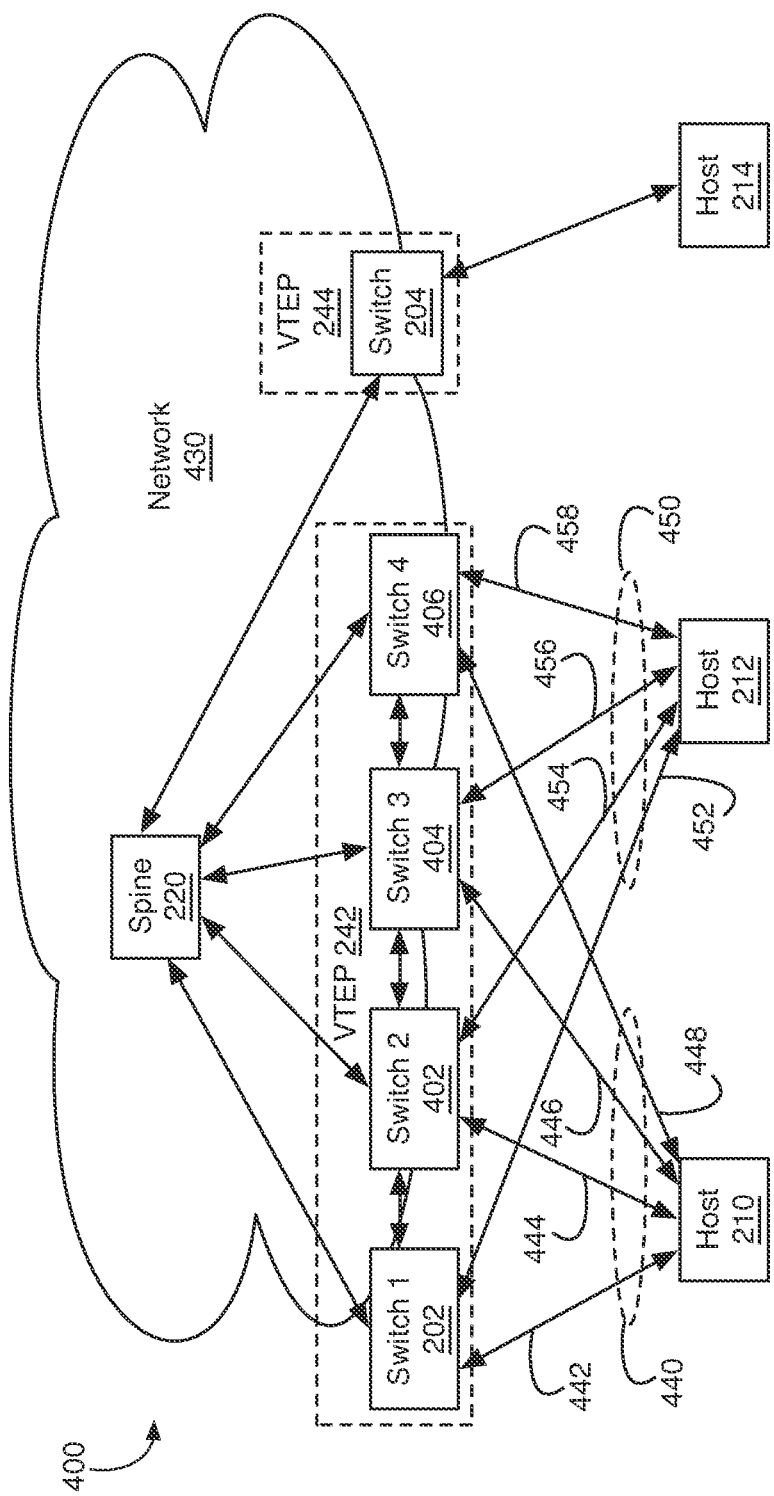
FIG. 4 is a block diagram of an example network including a VXLAN configured with dynamically addressed n-way virtual port channels.

FIG. 4 is a block diagram of an example network 400 including a VXLAN 430 configured with dynamically addressed n-way virtual port channels. For example, an n-way virtual port channel can be configured with one or more (e.g., greater than two) switches. The VIP address for the VPC can be dynamically adjusted based on which links (or switches) are available in the virtual port channel. For example, a switch (e.g., a top of rack switch "ToR") can have multiple ports linked to multiple end host devices. Links from different switches to the same end host device can be combined to create a virtual port channel. Links can fail due to a port failure at the switch or the end host device. Links can fail when a switch fails.

In some implementations, a host can be connected to one or more switches through a virtual port channel. For example, the virtual port channel can have one, two, three, or more connections to one, two, three, or more different switches. Host 210 can be connected to switch 202, switch 402, switch 404 and switch 406, for example, through virtual port channel 440 having links 442-448. Similarly, host 212 can be connected to switch 202, switch 402, switch 404 and switch 406 through virtual port channel 450 having links 452-458. While the examples given here include four links in each virtual port channel, the virtual port channels can have 8 or more active links to 8 or more switches.

In some implementations, the switches can advertise reachability to their VIP address by sending special TLV in the routing protocol link-state-advertisement packets (LSPs). For example, a switch Y which wants to participate in a VPC_GROUP_ID will advertise reachability to the prefix VPC_GROUP_ID.xxxYxxxx where x bits are masked out and Y bit is set to 1. Typically, this will be done by using a policy-based-routing mechanism where if the destination IP is of the form VPC_GROUP_ID.xxxYxxxx where the x bits can be either 1 or 0 the Y bit is 1 means packet is forwarded to $5^{th}$ switch in the corresponding VPC group. Alternately, one can expand all the possible addresses in the range with the Y bit set to 1 and program that in the routing table. What this means is that anytime an destination IP with first 24 bits matching VPC_GROUP_ID and Y's bit 1 is seen then switch Y can be a potentially recipient of the packet. Any intermediate switch that receives all these routing LSPs with special TLVs can program its hardware to support ECMP. For example say another switch advertises reachability for Z-bit in same VPC group ID i.e. VPC_GROUP_ID.xxxxZxxx. Then by combining these two advertisements, a spine switch can program its routing table to forward packets addressed to VPC_GROUP_ID.00011000 to either of the switch Y or Z; forward packets addressed to VPC_GROUP_ID.00010000 to switch Y; and forward packets addressed to VPC_GROUP_ID.00001000 to switch Z. If all the 8 switches (e.g., using all 8 bits, VPC_GROUP_ID.11111111) are advertising the respective LSP TLV for reachability, then the switch can program 256 routing entries to support ECMP at the spine and other switches.

In some implementations, the switches in a VPC can be configured with a VPC peer group identifier (VPCID). For example, the VPCID can be a 24-bit identifier assigned to each switch in the VPC peer group. The VPC peer group that includes switches 202, 402, 404 and 406 can have a VPCID of 2.2.2, for example. The VTEP IP address for a VPC can be a combination of the VPCID occupying the 24 most significant bits and an 8-bit value occupying the 8 least significant bits. Each bit in the 8-Least-significant-bit value can be used to indicate whether a link (or switch) corresponding to the bit is active. For example, VPC 440 includes links 442, 444, 446 and 448 so only 4 of the 8 bits are required. If there were 8 links to eight switches, all 8 bits would be used. The four least significant bits in the 8-bit value can be used to indicate whether each link is active. For example, the 8-bit value can be 0000XXXX, where each X bit can be toggled (e.g., 0 or 1) to indicates whether the link is active (e.g., 1 is active, 0 is inactive). Thus, if all four links were active, the 8-bit value would be 00001111. If switch 1 (e.g., switch 202) is inactive, the 8-bit value will be 00001110. The VTEP IP address for the VPC 440 would then be 2.2.2.15 if all four links were active. The VTEP IP address for VPC 440 would be 2.2.2.14 if the link from switch 1 (e.g., switch 202) is inactive.

In some implementations, each switch in the VPC peer group can report the reachability of a host to the other switches in the VPC peer group using the VPCID and each switch's respective bit. This is typically done using a TLV (type length value) field in a link-state-advertisement packet (LSP) of the routing protocol used in the vxlan infra network. For example, switch 1 (202) can report link state using the least significant of the 8 bits (e.g., 00000001). Switch 2 (402) can report link state using the second least significant of the 8 bits (e.g., 00000010). Switch 3 (404) can report link state using the third least significant of the 8 bits (e.g., 00000100). Switch 4 (406) can report link state using the fourth least significant of the 8 bits (e.g., 00001000).

In some implementations, a VTEP IP address can be generated by combining the least significant 8 bits from all switches that can reach a host. For example, each switch in a VPC peer group communicates with the other switches in the VPC peer group over the control plane to determine which local ports are available and to determine what virtual IP address (e.g., VTEP IP address) should be for a given VPC port. For example, if switch 202, switch 402, switch 404 and switch 406 all have active ports connected to host 210, then the VTEP IP address for each of those ports (e.g., VPC 440) can be 2.2.2.15. If only switch 202, 402 and 404 have active ports that can reach host 212, then the VTEP IP address for those ports (e.g., VPC 450) will be 2.2.2.7. Each switch can then report reachability (e.g., through a control plane mechanism or other remote TEPs can learn about the host to VIP binding from data plane) to host 210 or host 212 using the generated VTEP IP address (e.g., 2.2.2.15 for host 210, 2.2.2.7 for host 212).

In some implementations, a VTEP IP address can be dynamically changed when a link connecting a VPC to a host fails or when a link connecting a VPC to a host is added or reestablished. For example, using the examples above, VPC 440 includes links to switches 202, 402, 404 and 406 and has a VTEP IP address of 2.2.2.15. If switch 202 fails or a link between switch 202 and host 210 fails, then the VTEP IP address for VPC 440 can be adjusted to 2.2.2.14 (e.g., the least significant 8 bits 00001111 become 00001110). Each switch that has an active port connecting to host 210 can use the VTEP IP address 2.2.2.14 to advertise connectivity to host 212.

Similarly, if a link between switch 406 and host 212 is added to VPC 450, the switches in VPC 450 can communicate with each other over the control plane to adjust the VTEP IP address to reflect the new link to host 212. The new VTEP IP address can be generated by turning on the bit in the least significant 8 bits of the VTEP IP address corresponding to the new link (e.g., 00000111 becomes 00001111). The VTEP IP address for VPC 450 would then change from 2.2.2.7 to 2.2.2.15. Each switch in VPC 450 would then report connectivity to host 212 using the adjusted VTEP IP address 2.2.2.15.

In some implementations, the dynamically adjusted VTEP IP address can be used to transmit packets through network 430. For example, as discussed with reference to FIG. 2 above, network 430 can be a VXLAN network that uses packet encapsulation to transmit packages through the network. When packets transmitted from a host device (e.g., host 210) are received by a VTEP switch in the VXLAN, the packets are encapsulated using a MAC Address-in-User Datagram Protocol having a packet format illustrated by FIG. 1. The packets are transmitted through the VXLAN according to mechanisms described with reference to FIG. 2. However, when the packets are transmitted from a host (e.g., host 212) that is connected to an n-way VPC, the outer source IP address of the encapsulated packet will be the dynamically generated VTEP IP address for the n-way VPC, as described above. When the packets are transmitted to a host (e.g., host 210) that is connected to an n-way VPC, the outer destination IP address of the encapsulated packet will be the dynamically generated VTEP IP address for the n-way VPC, as described above.

Figure 5:
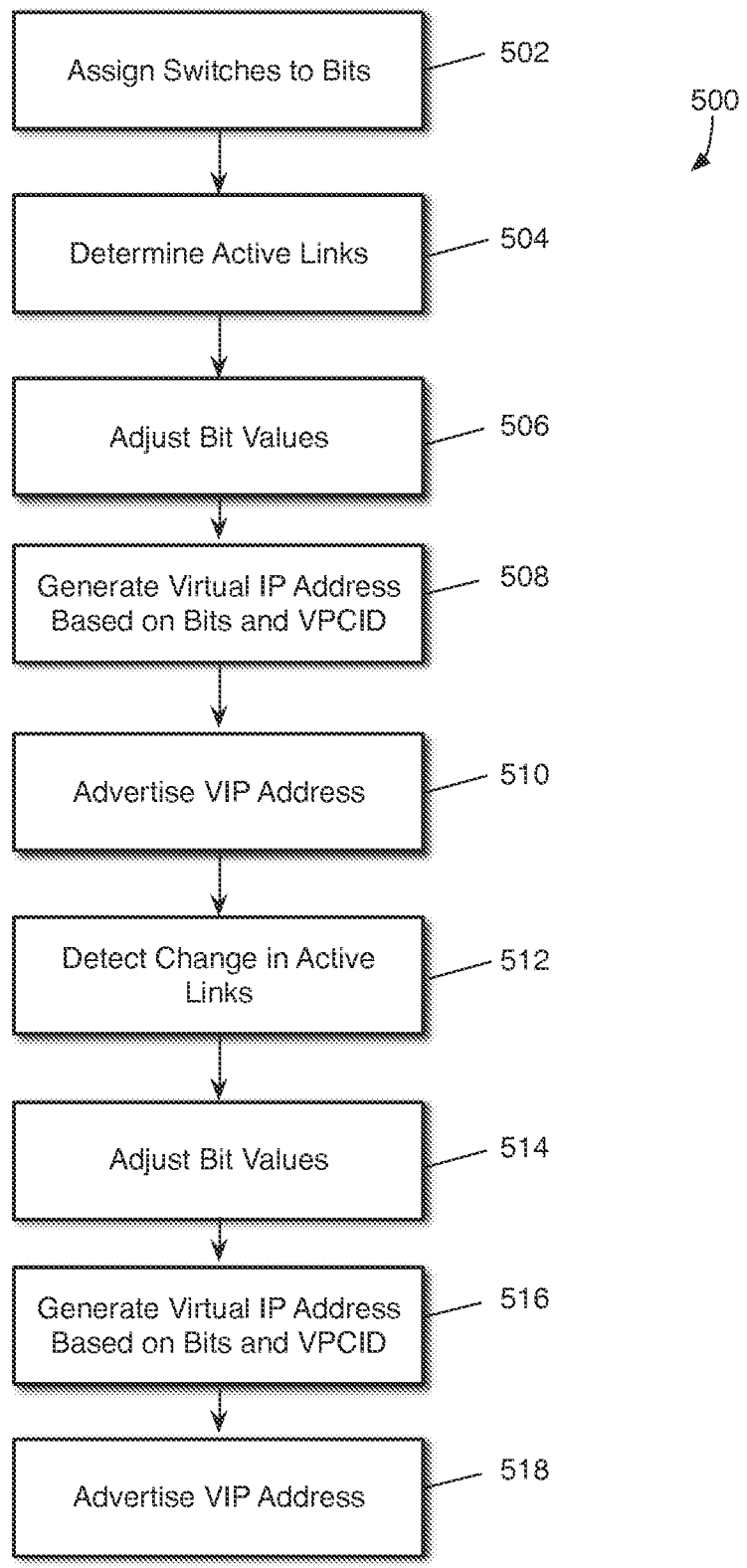
FIG. 5 is a flow diagram of an example process for dynamically addressing virtual port channels.

FIG. 5 is a flow diagram of an example process 500 for dynamically addressing virtual port channels. For example, an n-way virtual port channel can be configured using top-of-rack (ToR) switches to provide increased bandwidth and failure mitigation for accessing end host devices in a large-scale multi-tenant network environment.

At step 502, switches assigned to a virtual port channel peer group can be assigned to bits of a virtual IP address. For example, a virtual port channel peer group can include one, two, three or more ToR switches (e.g., switches 202-204; 402-406). The virtual port channel peer group can be assigned an identifier (e.g., 22.22.22) that can be used as an IP address prefix for the virtual port channels supported by the peer group. The prefix can be any number of bits. For example, the prefix can be 24 bits. A virtual IP address can be a 32-bit address. If the IP address prefix for the VPC peer group is 24 bits, 8 bits (e.g., the least significant 8 bits) remain in the virtual IP address for tracking which ToR switch links are available in a VPC. For example, if there are 8 switches in the VPC peer group, each of the 8 switches can be assigned one of the least significant 8 bits in the virtual IPI address. Each of the 8 bits can be turned on or off (e.g., 1 or 0) to indicate whether the link supported by the corresponding switch is active.

At step 504, the VPC peer group can determine which links in the virtual port channel are active. For example, each of the 8 switches in the VPC peer group can provide a link to a host device. Each switch in the VPC peer group can communicate with other switches in the VPC peer group to indicate whether the switch's local port is connected to the host device. For example, each switch in the VPC peer group can transmit a multicast packet over the control plane connection to other switches in the VPC peer group to indicate whether the transmitting switch's local port is connected to the host device. The switches in a VPC peer group can also receive and transmit heartbeat packets to other switches in the VPC peer group. If a switch fails to send a heartbeat packet, the other switches will determine that the switch is unavailable and, therefore, all of the links supported by the failed switch are unavailable.

At step 506, each switch can adjust the bit values associated with other switches in the VPC peer group. For example, upon receiving the multicast packet, each switch can generate a virtual IP address for the virtual port channel by setting the bits corresponding to each switch to 1 or 0 based on whether the corresponding switch has an active link to the host or not. If the switch has an active link to the host, the switch's bit can be set to 1. If the switch does not have an active link to the host, the switch's bit can be set to 0.

At step 508, each switch in the VPC peer group can generate an IP address for the virtual port channel associated with the host. For example, once a switch has adjusted the bit values of the least significant 8 bits in the virtual IP address, those bits can be combined with the VPC group identifier (e.g., 22.22.22) to generate the virtual IP address for the VPC (e.g., 22.22.22+00101001 or 22.22.22.41).

At step 510, each switch can advertise its link state using the virtual IP address for the VPC. For example, the virtual IP address can be used as a VXLAN tunnel end point (VTEP) address for transmitting packets through a VXLAN using the n-way virtual port channel, as described above.

At step 512, the switches in the VPC peer group can detect a change in the active links in the VPC peer group. For example, each switch in the VPC peer group can monitor its local ports and communicate with other switches in the VPC peer group to indicate whether the switch's local port is connected or is not connected to the host device. For example, each switch in the VPC peer group can transmit a multicast packet over the control plane connection to other switches in the VPC peer group to indicate that the transmitting switch's local port has failed and is no longer connected to the host device. The switches in a VPC peer group can receive and transmit heartbeat packets to other switches in the VPC peer group. If a switch fails to send a heartbeat packet, the other switches will determine that the switch is unavailable.

At step 514, each switch can adjust the bit values associated with other switches in the VPC peer group. For example, upon receiving the multicast packet at step 512, each switch can generate a virtual IP address for the virtual port channel by setting the bits corresponding to each switch to 1 or 0 based on whether the corresponding switch has an active link to the host or not. If the switch has an active link to the host, the switch's bit can be set to 1. If the switch does not have an active link to the host, the switch's bit can be set to 0.

At step 516, each switch in the VPC peer group can generate an IP address for the virtual port channel associated with the host. For example, once a switch has adjusted the bit values of the least significant 8 bits in the virtual IP address, those bits can be combined with the VPC group identifier (e.g., 22.22.22) to generate the virtual IP address for the VPC (e.g., 22.22.22.00101011 or 22.22.22.43, 22.22.22.00101000 or 22.22.22.40).

At step 518, each switch can advertise its link state using the virtual IP address for the VPC. For example, the virtual IP address can be used as a VXLAN tunnel end point (VTEP) address for transmitting packets through a VXLAN, as described above.

Thus, by adjusting the bits of a virtual IP address associated with links and/or switches of a virtual port channel, the virtual port channel can be configured to include one, two, three or more switches. The virtual port channel can adjust the bits of the virtual IP address to accommodate the removal and addition of links to the virtual port channel. The virtual port channel can be configured to support much higher bandwidths than were previously possible when using traditional 2-way virtual port channel techniques.

While the examples above are described in terms of a VXLAN, one of ordinary skill in the art will readily recognize that the concepts provided herein can be implemented using other overlay network protocols, such as NVGRE, VO3, or STT. Indeed, VXLAN protocol is used herein to provide non-limiting examples for the sake of clarity.

Figure 6:
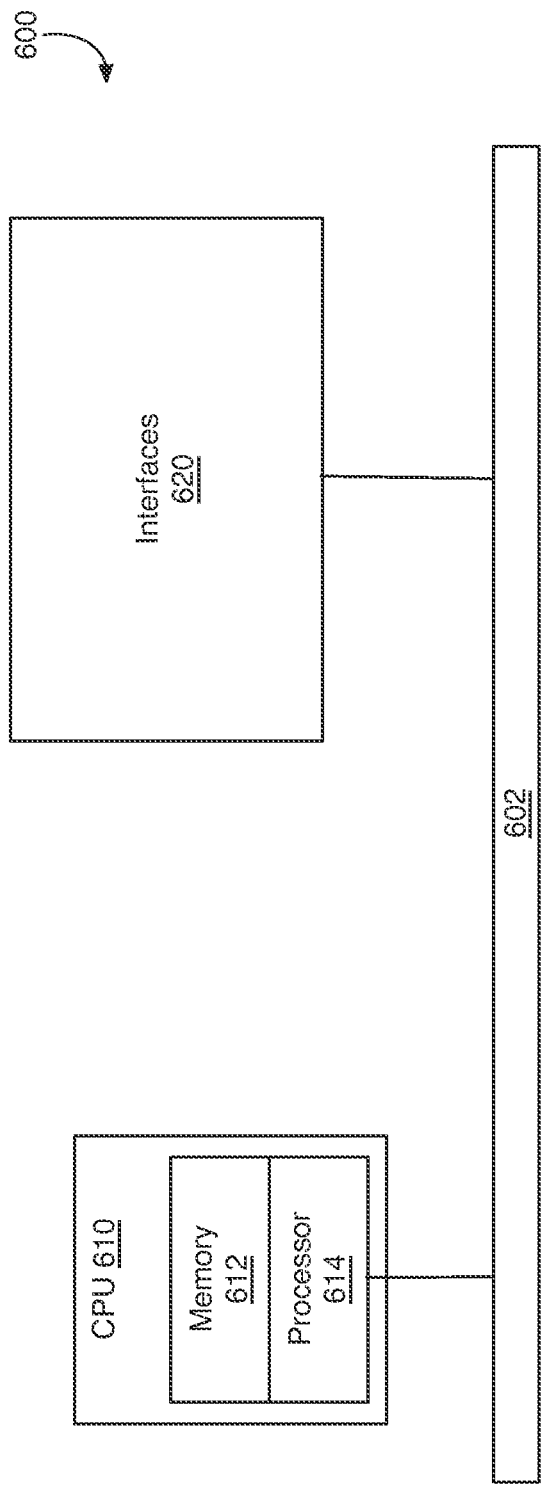
FIG. 6 illustrates an example network device suitable for implementing dynamic addressing of virtual port channels.

FIG. 6 illustrates an example network device 600 suitable for implementing dynamic addressing of virtual port channels. Network device 600 includes a master central processing unit (CPU) 610, interfaces 620, and a bus 602 (e.g., a PCI bus). When acting under the control of appropriate software or firmware, the CPU 610 is responsible for executing packet management, error detection, and/or routing functions, such as miscabling detection functions, for example. The CPU 610 preferably accomplishes all these functions under the control of software including an operating system and any appropriate applications software. CPU 610 may include one or more processors 614 such as a processor from the Motorola family of microprocessors or the MIPS family of microprocessors. In an alternative embodiment, processor 614 is specially designed hardware for controlling the operations of router 600. In a specific embodiment, a memory 612 (such as non-volatile RAM and/or ROM) also forms part of CPU 610. However, there are many different ways in which memory could be coupled to the system.

The interfaces 620 are typically provided as interface cards (sometimes referred to as "line cards"). Generally, they control the sending and receiving of data packets over the network and sometimes support other peripherals used with the router 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 610 to efficiently perform routing computations, network diagnostics, security functions, etc.

Although the system shown in FIG. 6 is one specific network device for implementing dynamic addressing of virtual port channels, it is by no means the only network device architecture on which dynamic addressing of virtual port channels can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 612) configured to store program instructions for the general-purpose network operations and dynamic addressing of virtual port channels, as described herein. The program instructions may control the operation of an operating system and/or one or more applications, for example. The memory or memories may also be configured to store virtual port channel configuration data (e.g., VPC addresses, VPC membership information, VPC peer group identification information, etc.). In some implementations, network device 600 can include system architecture 700, described below.

Figure 7:
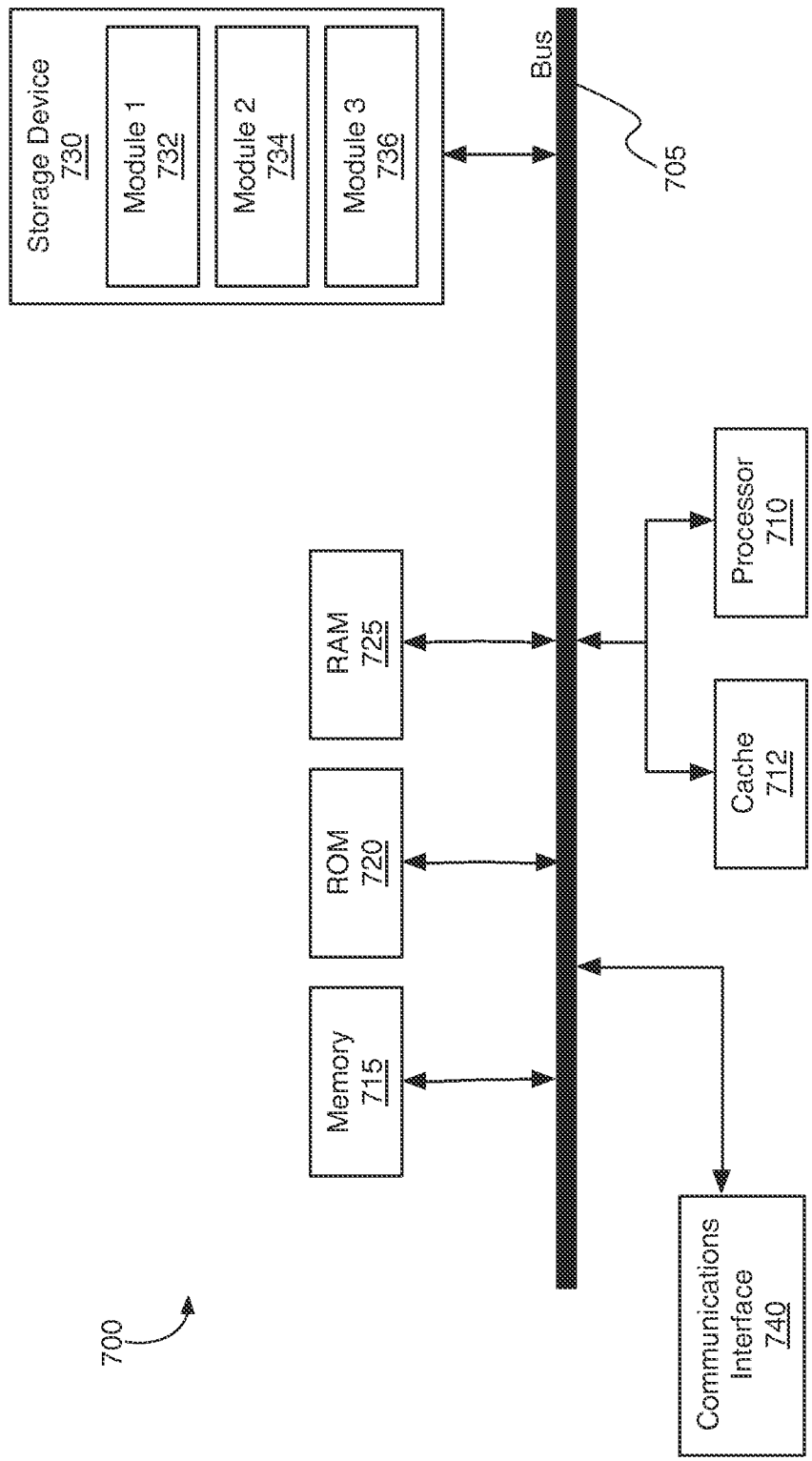
FIG. 7 illustrates an example computing system architecture suitable for implementing dynamic addressing of virtual port channels.

FIG. 7 illustrates an example computing system architecture 700 wherein the components of the system 700 are in electrical communication with each other using a bus 705. System 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions.

Other system memory 715 may be available for use as well. The memory 715 can include multiple different types of memory with different performance characteristics. The processor 710 can include any general purpose processor and a hardware module or software module, such as module 6 732, module 7 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of non-transitory computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include computer code and instructions that can be executed by one or more processors to perform one or more operations according to the code and instructions. For example, the non-transitory computer readable media can store instructions which, when executed by a processor, causes the processor to perform operations defined in the instructions.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A method comprising:
    receiving, at a first network device, link state information from one or more second network devices in a virtual port channel peer group, the virtual port channel peer group including a plurality of network devices configured for a virtual port channel;
    setting, by the first network device, a value of a first and second bit in a virtual internet protocol address based on the received link state information; and
    wherein the link state information indicates whether a first and second link to a host device in the virtual channel peer group is active or inactive;
    wherein the value of the first bit corresponds to the state of the first link; and
    wherein the value of the second bit corresponds to the state of the second link;
    advertising, by the network device, the virtual internet protocol address for the virtual port channel.

2. The method of claim 1, wherein the network device is configured with a virtual port channel peer group identifier.

3. The method of claim 2, wherein the virtual internet protocol address includes the virtual port channel peer group identifier.

4. The method of claim 1, further comprising:
    generating a new internet protocol address for the virtual port channel when new link state information is received that indicates a change in a link state of one of the network devices.

5. A non-transitory computer-readable medium including one or more sequences of instructions which, when executed by one or more processors, causes:
    receiving, at a first network device, link state information from one or more second network devices in a virtual port channel peer group, the virtual port channel peer group including a plurality of network devices configured for a virtual port channel;
    setting, by the first network device, a value of a first and second bit in a virtual internet protocol address based on the received link state information; and
    wherein the link state information indicates whether a first and second link to a host device in the virtual channel peer group is active or inactive;
    wherein the value of the first bit corresponds to the state of the first link; and
    wherein the value of the second bit corresponds to the state of the second link;
    advertising, by the network device, the virtual internet protocol address for the virtual port channel.

6. The non-transitory computer-readable medium of claim 5, wherein the network device is configured with a virtual port channel peer group identifier.

7. The non-transitory computer-readable medium of claim 6, wherein the virtual internet protocol address includes the virtual port channel peer group identifier.

8. The non-transitory computer-readable medium of claim 5, wherein the instructions cause:
    generating a new internet protocol address for the virtual port channel when new link state information is received that indicates a change in a link state of one of the network devices.

9. A system comprising:
    one or more processors; and
    a computer-readable medium including one or more sequences of instructions which, when executed by the one or more processors, causes:
    receiving, at a first network device, link state information from one or more second network devices in a virtual port channel peer group, the virtual port channel peer group including a plurality of network devices configured for a virtual port channel;
    setting, by the first network device, a value of a first and second bit in a virtual internet protocol address based on the received link state information; and
    wherein the link state information indicates whether a first and second link to a host device in the virtual channel peer group is active or inactive;

wherein the value of the first bit corresponds to the state of the first link; and wherein the value of the second bit corresponds to the state of the second link;

advertising, by the network device, the virtual internet protocol address for the virtual port channel.

10. The system of claim 9, wherein the network device is configured with a virtual port channel peer group identifier.

11. The system of claim 10, wherein the virtual internet protocol address includes the virtual port channel peer group identifier.

12. The system of claim 9, wherein the instructions cause:

generating a new internet protocol address for the virtual port channel when new link state information is received that indicates a change in a link state of one of the network devices.

* * * * *